April 14, 1953     J. B. PICARD     2,634,619
TRANSMISSION FOR RIG DRIVES
Filed Oct. 6, 1950     2 SHEETS—SHEET 1
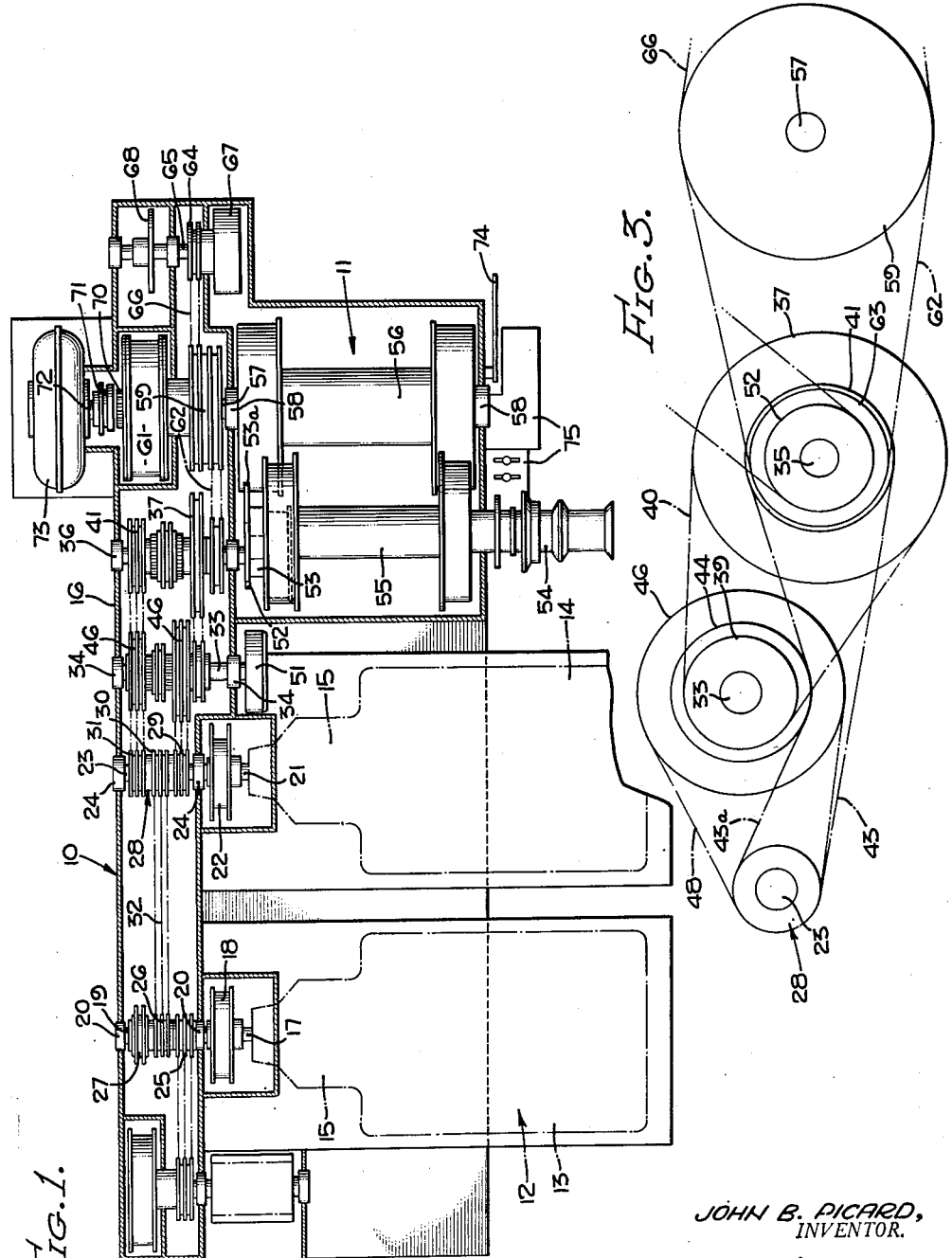
JOHN B. PICARD,
INVENTOR.
BY
*Lyon + Lyon*
ATTORNEYS

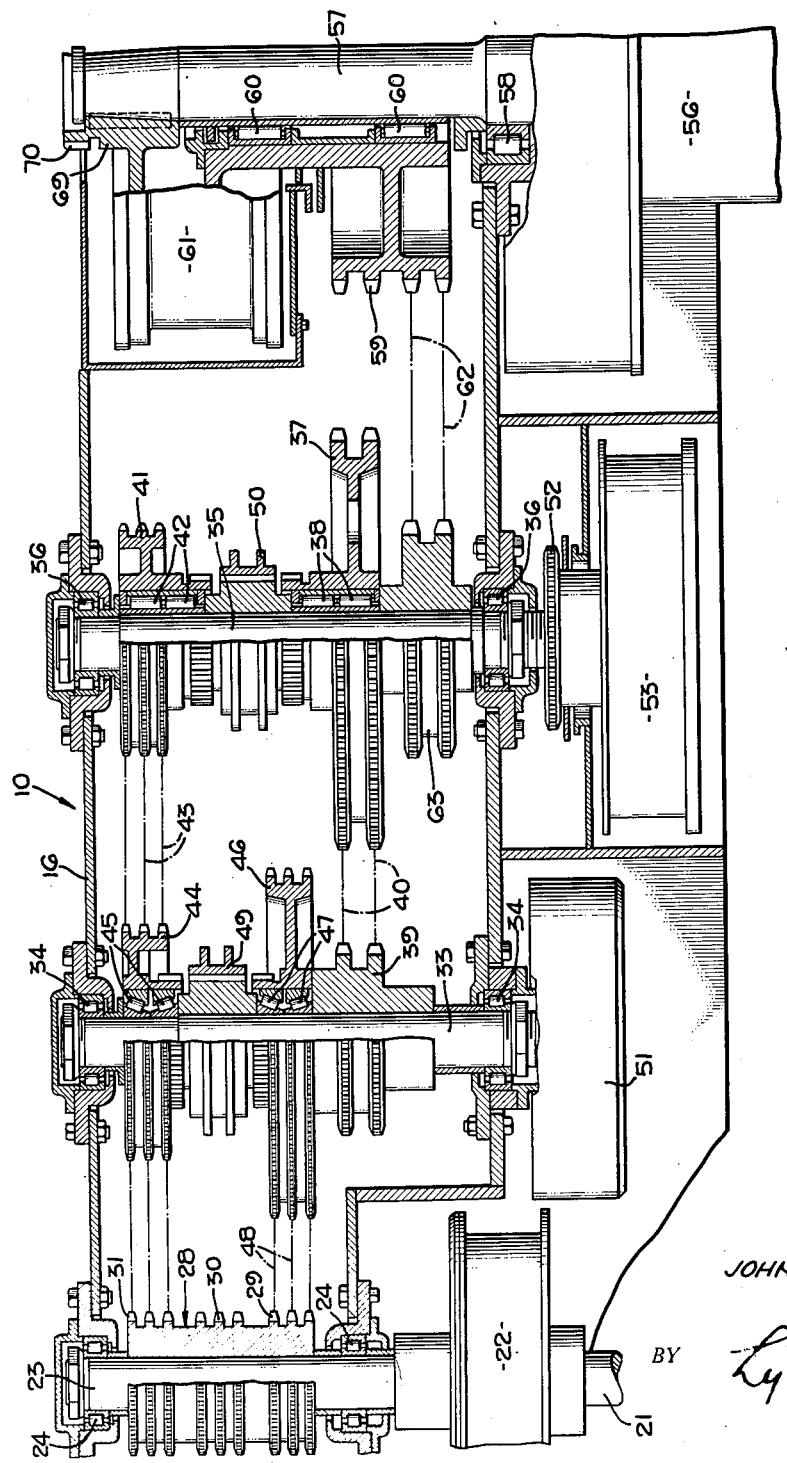

_Patented Apr. 14, 1953_                                                                                                                        2,634,619

UNITED STATES PATENT OFFICE 2,634,619

TRANSMISSION FOR RIG DRIVES

John B. Picard, Los Angeles, Calif., assignor to
The National Supply Company, Pittsburgh, Pa.,
a corporation of Pennsylvania Application October 6, 1950, Serial No. 188,759

9 Claims. (Cl. 74—218)

This invention relates to well drilling apparatus and is particularly directed to improvements in power transmission devices for driving a drawworks and rotary machine from a power plant.

It is an object of this invention to provide a novel form of reverse drive for a transmission of this type which does not require any additional shaft or bearing elements.

Another object is to provide a power transmission of this type which is constructed so that all of its parts are on only one side of the drawworks and power plant.

Another object is to provide a transmission for a rig drive which is particularly adapted for a power plant employing a hydraulic torque converter of the type illustrated in the Lysholm Patent No. 1,900,118, issued March 7, 1933.

Another object is to provide a drilling rig and power transmission of this type which are adapted for highway transportation as a unit and which, therefore, are no greater than the eight-foot maximum width which may be transported over highways without special permit.

A more detailed object is to provide a power transmission assembly of this type in which the friction clutches are mounted on overhanging ends of their supporting shafts so that the clutches may be readily disassembled for servicing and for replacing the friction linings.

Other and more detailed objects and advantages will appear hereinafter.

In the drawings:

Figure 1 is a plan view, partly broken away, showing a preferred embodiment of my invention.

Figure 2 is a sectional plan view of a portion of the apparatus shown in Figure 1, illustrated on an enlarged scale.

Figure 3 is a diagrammatic end view illustrating the plan of operation of the reverse drive provided by my transmission.

Referring to the drawings, the power transmission unit generally designated 10 serves to connect a drawworks 11 and a rotary machine (not shown) with a power plant generally designated 12.

As shown in the drawings, the power plant 12 comprises two separate combustion engines 13 and 14, each of which is directly connected to drive a torque converter 15. A single internal combustion engine unit may be employed or, if desired, more than two such units may be used.

In accordance with my invention the transmission unit 10 comprises an elongated casing 16, which forms an enclosure for a plurality of chain drives. A power take-off shaft 17 from the engine unit 13 operates through a suitable friction clutch 18 to drive the stub shaft 19 supported in axially spaced bearings 20. The bearings 20 are supported on the casing 16. Similarly, the stub shaft 21, driven by the engine unit 14, operates through a suitable friction clutch 22 to drive the stub shaft 23. The stub shaft 23 is supported in axially spaced bearings 24 carried on the casing 16.

A sprocket 25 is fixed on the stub shaft 19 and another sprocket 26 is rotatably mounted on the stub shaft 19 and adapted to be connected in driving relation therewith by means of a positive spline or jaw clutch 27. A triple sprocket member 28 is fixed on the stub shaft 23 and this member 28 carries three separate sprockets 29, 30 and 31. A chain 32 connects the sprockets 26 and 30.

A drive shaft 33 is rotatably mounted in spaced bearings 34 carried on the casing 16 and this shaft is positioned at a relatively high elevation as shown in Figure 3. A jackshaft 35 is carried on spaced bearings 36 mounted on the casing 16 and this jackshaft 35 supports a low speed driven sprocket 37. This sprocket 37 is rotatably supported on the shaft 35 by means of bearings 38. A low speed driving sprocket 39 is fixed on the drive shaft 33 and is connected to drive the sprocket 37 by means of the chain 40. A high speed drive to the shaft 35 from the member 28 is provided by means of the sprocket 31 on the stub shaft 23 and the sprocket 41 rotatably mounted on the jackshaft 35 by means of the bearings 42. A chain 43 is trained over the sprockets 31 and 41. As shown in Figure 3, the upper flight 43a of the chain 43 passes under and engages the teeth of the reverse drive sprocket 44, which is rotatably mounted on the drive shaft 33. Bearings 45 rotatably support the sprocket 44 on the shaft 33. Rotation of the sprocket 31 causes the sprocket 41 to be driven in the same direction and causes the sprocket 44 to be driven in the opposite direction.

A low speed driven sprocket 46 is rotatably supported on the drive shaft 33 by means of the bearings 47. This sprocket 46 is driven from the sprocket 29 by means of the chain 48.

A spline clutch 49 is positioned between the sprockets 44 and 46 and is shiftable axially to connect either of these sprockets in direct driving relation with respect to the drive shaft 33. Similarly, a spline clutch 50 is positioned between the sprockets 41 and 37 and is shiftable axially to connect either of these sprockets in direct driving relationship with the jackshaft 35.

From this description it will be understood that the jackshaft 35 can be driven at a low speed from the member 28 by engaging the spline clutch 49 with the sprocket 46 and by engaging the spline clutch 50 with the sprocket 37.

A high speed forward drive to the jackshaft 35 from the member 28 can be obtained by engaging the spline clutch 50 with the sprocket 41.

A low speed reverse drive to the shaft 35 is accomplished by engaging the spline clutch 49 with the sprocket 44 and by engaging the spline clutch 50 with the sprocket 37. In the latter case the reversely rotating sprocket 44 is connected to the drive shaft 33 and the reverse drive is communicated to the jackshaft 35 through the sprocket 39, chain 40 and sprocket 37.

It should be noted that it is not possible to shift the spline clutches 49 and 50 into positions which would jam the transmission by attempting to drive through two different power paths at the same time. Thus, no interlock to prevent shifting of the clutches 49 and 50 into any certain combination of positions is required. If the clutch 49 should be engaged with the sprocket 44 while the clutch 50 is engaged with the sprocket 41, no reverse rotation but only forward rotation is transmitted to the jackshaft 35, because the reversely rotating sprocket 37 is not clutched to the shaft 35.

A suitable brake 51 may be mounted on the inner overhanging end of the drive shaft 33 for arresting rotation of this shaft when desired. This brake preferably takes the form of a pneumatically operated friction brake.

A power take-off sprocket 52 may be rotatably mounted on the inner overhanging end of the jackshaft 35. This sprocket may be placed in direct driving relationship with the jackshaft 35 by means of a pneumatically operated friction clutch 53. The power take-off sprocket 52 may be employed to drive the sprocket 53ª fixed on the cat shaft 54 of the drawworks 11. If desired, a sand reel 55 may be rotatably mounted on this cat shaft 54.

The drawworks 11 includes the spooling drum 56 having the usual brake rims at each end. The drum 56 is fixed on a drum shaft 57 mounted in spaced bearings 58. The sprocket 59 is rotatably mounted on axially spaced bearings 60 carried on the overhanging end of the drum shaft 57. A pneumatically operated friction clutch 61 is provided for placing the sprocket 59 in direct driving relation with the drum shaft 57. The sprocket 59 is connected by a chain 62 with the driving sprocket 63 fixed on the jackshaft 35. From this description it will be understood that for each speed of the triple sprocket member 28 the drum shaft 57 may be driven at a high speed forward, a low speed forward and a low speed reverse.

The dual sprocket 59 is also connected to drive the sprocket 64, which is rotatably mounted on a countershaft 65. A chain 66 connects the sprockets 64 and 59. A friction clutch 67 is provided to connect the sprocket 64 in direct driving relation with the countershaft 65. A power take-off sprocket 68 is fixed on the countershaft 65 and is adapted to drive the usual rotary machine (not shown) by means of a suitable chain.

The two forward speeds and reverse thus provided are adequate in this type of rig drive transmission because the hydraulic torque converters 15 afford a stepless variable speed drive from the engine units 13 and 14.

The clutch 61 may include a hub 69 fixed on the drum shaft 57 and this hub may be provided with a spline ring 70. A spline clutch 71 may be employed to connect the spline ring 70 with the brake shaft 72, and an auxiliary brake 73 of hydraulic or electric type is connected to the shaft 72. When the clutch 71 is shifted to place the auxiliary brake 73 in direct driving relation with the drum shaft 57, the brake acts to impede unspooling movement of the drum 56.

When the device is to be transported over a highway, the engine units 13 and 14 are removed and are separately transported. The auxiliary brake 73, clutch 71, shaft 72 and associated parts are likewise removed. The cathead 54, brake control lever 74, laterally projecting parts 75 are demountable from the other side of the device. The overall maximum width of the drawworks and transmission assembly is then no greater than the maximum width of eight feet commonly permitted for highway travel without special permit.

The power transmission unit is located entirely at one side of the drawworks, and the various chain drives are enclosed in the same (sectional) housing. This simplifies the construction of the device and facilitates servicing of the parts thereof. It will be observed that the friction clutches 18, 22 and 53, as well as the friction brake 51 are located outside the chain enclosure.

Having fully described my invention, it is to be understood that I do not wish to be limited to the details herein set forth, but my invention is of the full scope of the appended claims.

I claim:

1. In a change speed transmission for a well drilling rig, the combination of: first and second groups of sprockets, each group including three axially spaced sprockets independently rotatable about a common axis, selectively operable clutch means in each group to connect either of two sprockets in driving relation with the third sprocket, a first driving sprocket, a first chain connecting said sprocket to one of the clutched sprockets in the first group, a second chain connecting the third sprocket in the first group to one of the clutched sprockets in the second group, a second driving sprocket, and a third chain connecting said second driving sprocket with the other clutched sprocket in the second group, said third chain having one flight thereof engaged on the back side by the other clutched sprocket in the first group so that the last-mentioned sprocket is turned in a reverse direction.

2. In a change speed transmission for a well drilling rig, the combination of: first and second groups of sprockets, the first group including three sprockets and the second group including at least two sprockets, the sprockets in each group being axially spaced and independently rotatable about a common axis, selectively operable clutch means in the first group to connect either of two sprockets in driving relation with the third sprocket, the second group including a power take-off element, selectively operable clutch means in the second group to connect either of the sprockets in driving relation with the power take-off element, a first driving sprocket, a first chain connecting said sprocket to one of the clutched sprockets in the first group, a second chain connecting the third sprocket in the first group to one of the clutched sprockets in the second group, a second driving sprocket, a third chain connecting said second driving sprocket with the other clutched sprocket in the second group, said third chain having one flight thereof engaged on the back-side by the other clutched sprocket in the first group so that the last-mentioned sprocket is turned in a reverse direction.

3. In a change speed transmission for a well drilling rig, the combination of: first and second groups of sprockets, the first group including three sprockets and the second group including at least two sprockets, the sprockets in each group being axially spaced and independently rotatable about a common axis, an axially shiftable double acting clutch in the first group to connect either of two sprockets in driving relation with the third sprocket, the second group including a power take-off element, an axially shiftable double acting clutch in the second group to connect either of the sprockets in driving relation with the power take-off element, a first driving sprocket, a first chain connecting said sprocket to one of the clutched sprockets in the first group, a second chain connecting the third sprocket in the first group to one of the clutched sprockets in the second group, a second driving sprocket, a third chain connecting said second driving sprocket with the other clutched sprocket in the second group, said third chain having one flight thereof engaged on the back-side by the other clutched sprocket in the first group so that the last-mentioned sprocket is turned in a reverse direction.

4. In a change speed transmission for a well drilling rig, the combination of: first and second parallel shafts, the first shaft having three sprockets mounted thereon and the second shaft having at least two sprockets mounted thereon, the sprockets on each shaft being axially spaced and independently rotatable, selectively operable clutch means on the first shaft to connect either of two sprockets in driving relation with the third sprocket, the second shaft having a power take-off element thereon, selectively operable clutch means on the second shaft to connect either of the sprockets in driving relation with the power take-off element, a first driving sprocket, a first chain connecting said sprocket to one of the clutched sprockets on the first shaft, a second chain connecting the third sprocket on the first shaft to one of the clutched sprockets on the second shaft, a second driving sprocket, a third chain connecting said second driving sprocket with the other clutched sprocket on the second shaft, said third chain having one flight thereof engaged on the back-side by the other clutched sprocket on the first shaft so that the last-mentioned sprocket is turned in a reverse direction.

5. In a change speed transmission for a well drilling rig, the combination of: first and second parallel shafts, means rotatably supporting the shafts, each shaft having a pair of axially spaced sprockets rotatably mounted thereon, selectively operable clutch means to connect either sprocket to the shaft, a rotary member having a pair of sprockets fixed thereon, a first chain connecting one of the latter said sprockets to one of the rotatable sprockets on the first shaft, a sprocket fixed on the first shaft, a second chain connecting said sprocket to one of the rotatable sprockets on the second shaft, and a third chain connecting the other sprocket on the rotary member with the other rotatable sprocket on the second shaft, said third chain having one flight thereof engaged on the back side by the other rotatable sprocket on the first shaft so that the last-mentioned sprocket is turned in a reverse direction.

6. In a change speed transmission for a well drilling rig, the combination of: first and second parallel shafts, means rotatably supporting the shafts, each shaft having a pair of axially spaced sprockets rotatably mounted thereon and an axially shiftable double acting clutch to connect either sprocket to the shaft, a rotary member having a pair of sprockets fixed thereon, a first chain connecting one of the latter said sprockets to one of the rotatable sprockets on the first shaft, a sprocket fixed on the first shaft, a second chain connecting said sprocket to one of the rotatable sprockets on the second shaft, and a third chain connecting the other sprocket on the rotary member with the other rotatable sprocket on the second shaft, said third chain having one flight thereof engaged on the back side by the other rotatable sprocket on the first shaft so that the last-mentioned sprocket is turned in a reverse direction.

7. In a change speed transmission for a well drilling rig, the combination of: a drive shaft; a jack shaft; means rotatably supporting said shafts in parallel relationship; a rotary driving member spaced from said shafts; means providing a low speed drive from said member to the jack shaft; said means including a first sprocket fixed on said member, a second sprocket rotatably mounted upon the drive shaft, a chain connecting said sprockets, a first clutch for connecting the second sprocket to the driveshaft, a third sprocket fixed on the driveshaft, a fourth sprocket rotatably mounted upon the jack shaft, a chain connecting the third and fourth sprockets, and a second clutch for connecting the fourth sprocket to the jack shaft; means providing a high speed drive from said member to the jack shaft; said means including a fifth sprocket fixed on said member, a sixth sprocket rotatably mounted upon the jack shaft, a chain connecting the fifth and sixth sprockets, the said second clutch being engageable with the sixth sprocket to connect it to the jack shaft; a seventh sprocket rotatably mounted upon the driveshaft and engaging the back side of one flight of the latter said chain so that the seventh sprocket rotates in a direction opposite to that of the fifth and sixth sprockets; the first said clutch being engageable with said seventh sprocket to connect it to the drive shaft, whereby the jack shaft may be driven in reverse direction through the third and fourth sprockets and second clutch.

8. In a change speed transmission for a well drilling rig, the combination of: a drive shaft; a jack shaft; means rotatably supporting said shafts in parallel relationship; a rotary driving member spaced from said shafts; means providing a low speed drive from said member to the jack shaft; said means including a first sprocket fixed on said member, a second sprocket rotatably mounted upon the drive shaft, a chain connecting said sprockets, clutch means for connecting the second sprocket to the driveshaft, a third sprocket fixed on the driveshaft, a fourth sprocket rotatably mounted upon the jack shaft, a chain connecting the third and fourth sprockets, and clutch means for connecting the fourth sprocket to the jack shaft; means providing a high speed drive from said member to the jack shaft; said means including a fifth sprocket fixed on said member, a sixth sprocket rotatably mounted upon the jack shaft, a chain connecting the fifth and sixth sprockets, clutch means engageable with the sixth sprocket to connect it to the jack shaft; a seventh sprocket rotatably mounted upon the driveshaft and engaging the back side of one flight of the latter said chain so that the seventh sprocket rotates in a direction opposite to that of the fifth and sixth sprockets; clutch means engageable with said seventh sprocket to connect it to the drive shaft, whereby the jack shaft may be driven in reverse direction through the third and fourth sprockets.

9. In a change speed transmission for a well drilling rig, the combination of: a drive shaft, a jack shaft; means rotatably supporting said shafts in parallel relationship; a rotary driving member spaced from said shafts; means providing a low speed drive from said member to the jack shaft; said means including a first sprocket fixed on said member, a second sprocket rotatably mounted upon the drive shaft, a chain connecting said sprockets, a first clutch for connecting the second sprocket to the driveshaft, a third sprocket fixed on the driveshaft, a fourth sprocket rotatably mounted upon the jack shaft, a chain connecting the third and fourth sprockets, and a second clutch for connecting the fourth sprocket to the jack shaft; means providing a high speed drive from said member to the jack shaft; said means including a fifth sprocket fixed on said member, a sixth sprocket rotatably mounted upon the jack shaft, a chain connecting the fifth and sixth sprockets, the said second clutch being engageable with the sixth sprocket to connect it to the jack shaft; a seventh sprocket rotatably mounted upon the driveshaft and engaging the back side of one flight of the latter said chain so that the seventh sprocket rotates in a direction opposite to that of the fifth and sixth sprockets; the first said clutch being engageable with said seventh sprocket to connect it to the drive shaft, whereby the jack shaft may be driven in reverse direction through the third and fourth sprockets and second clutch.

JOHN B. PICARD.

References Cited in the file of this patent

UNITED STATES PATENTS

| Number | Name | Date |
|---|---|---|
| 1,250,903 | Kyle | Dec. 18, 1917 |
| 2,309,285 | Walton | Jan. 26, 1943 |